United States Patent
Bachner et al.

[19]

[11] Patent Number: 6,085,489
[45] Date of Patent: Jul. 11, 2000

[54] SPOUT MANDREL WITH ENERGY RING

[75] Inventors: Jerry G. Bachner, Algonquin; Michael A. Kipp, Bartlett, both of Ill.

[73] Assignee: NIMCO Corporation, Crystal Lake, Ill.

[21] Appl. No.: 09/102,456

[22] Filed: Jun. 22, 1998

[51] Int. Cl.[7] ............................ B32B 31/16; B65B 51/22; B65B 61/00
[52] U.S. Cl. ........................ 53/410; 53/133.2; 53/DIG. 2; 493/87; 156/580.2
[58] Field of Search .......................... 493/87; 53/133.2, 53/DIG. 2, 410, 412, 416; 156/580.2, 580.1, 73.1

[56] References Cited

U.S. PATENT DOCUMENTS

| | | | |
|---|---|---|---|
| 4,601,425 | 7/1986 | Bachner | 229/17 |
| 4,964,562 | 10/1990 | Gordon | 493/87 |
| 5,110,040 | 5/1992 | Kalberer et al. | 53/DIG. 2 X |
| 5,244,520 | 9/1993 | Gordon et al. | 53/DIG. 2 X |
| 5,435,803 | 7/1995 | Owen et al. | 493/87 |
| 5,484,374 | 1/1996 | Bachner et al. | 493/87 |
| 5,601,669 | 2/1997 | Moody et al. | 493/87 X |

*Primary Examiner*—James F. Coan
*Attorney, Agent, or Firm*—Jenner & Block

[57] ABSTRACT

An applicator attaches spouts and other fitments to paperboard cartons and the like in automated packaging equipment. The applicator features a rotatable and translatable anvil housing having a plurality of radially extending lobes, each lobe having an anvil thereon, said anvil having an energy ring thereon to facilitate ultrasonic attachment of the spout to the carton. A mandrel or other engagement mechanism on each lobe engages and holds spouts for attachment to a container. The anvil inserts a spout into a container hole, and an ultrasonic sealer ultrasonically vibrates the carton wall against the energy ring of the anvil to weld the spout to the carton.

15 Claims, 8 Drawing Sheets

SPOUT MANDREL WITH ENERGY RING

FIELD OF THE INVENTION

The invention relates to machinery for attaching reclosable spouts to containers, such as paperboard cartons used for holding liquids and solids and the like, and, more particularly to ultrasonic welding devices employing an energy ring.

BACKGROUND OF THE INVENTION

A common and useful type of container is the paperboard carton having a gabled top. Examples of such cartons include the everyday milk carton. In recent years, these cartons have been used for numerous other products, including foods, beverages and detergents. These cartons are typically coated or laminated with a heat-sealable plastic, which is used by manufacturers to seal the cartons.

Typically, the contents of these cartons are dispensed by ripping open the gable top and unfolding a pourable spout. Once the carton is ripped open, it cannot be tightly resealed. To address this problem, cartons have been devised with reclosable spouts. These spouts are also referred to in the field as fitments, closures and caps. For convenience, they are referred to herein as "reclosable spouts."

A conventional spout is opened and closed by means of a removable cap, snap, hatch or the like. In the case of a capped spout, a person using the carton removes the cap to dispense the contents of the carton (typically a beverage). Because the carton has not been torn open, the contents can be tightly resealed.

Cartons having reclosable spouts are typically manufactured with automatic machinery (often referred to as "packaging machinery") which forms the carton from a flat piece (or "blank") of paperboard or other suitable material. After the carton has been partially formed (but not filled or sealed), the reclosable spout is attached. A typical spout consists of a plastic cylinder having a mounting flange at one end and a threaded, removable cap (or other conventional closure) at the other. The spout is mounted from inside the carton through a preformed hole formed in the paperboard blank so that the capped end extends outward, while the flange is flush against the interior side of the carton wall. The flange is then ultrasonically welded to the wall of the carton. Examples of these types of containers and spouts are provided by U.S. Pat. No. 4,964,562 to Gordon and U.S. Pat. No. 4,601,425 to Bachner. Examples of these types of containers and spouts are also disclosed in U.S. Pat. No. 5,484,374 to Bachner et al., which is incorporated herein by reference.

The component of packaging machinery which attaches spouts to cartons is often referred to as an "applicator." One type of applicator operates in two distinct steps. First, before the carton is filled and sealed, the applicator inserts the spout through the die cut hole. The applicator then moves the carton to a second station, where an anvil is placed inside the carton to firmly hold the spout's flange against the carton wall. An ultrasonic sealer located outside the carton then welds the flange to the carton. Alternatively, a one-step applicator system, such as shown in U.S. Pat. No. 5,484,374 to Bachner et al., can be used to simultaneously insert and weld the spout.

With respect to gable-top cartons where a plastic spout is welded to the carton surface, the current applicator art includes a sonic horn which may have an 'energy ring' on the horn surface and a generally flat anvil surface (which is or may be part of a rotating 'anvil housing') against which the horn presses to weld the spout flange to the carton surface. There is also typically a spout mandrel device, onto which the spout is placed, to move the spout from the 'saddle' (where the spout is positioned to be picked-up by the spout mandrel), and to position the spout within the aperture of the carton. This spout mandrel is secured to the anvil by means of a machine bolt. As the anvil component is the recipient of continuous pressure and vibration during the ultrasonic sealing process, the surface of the anvil can wear and produce uneven and poor welds.

In order to weld an 'inside-out-spout' to the carton surface, the ultrasonic horn with the energy ring must weld through the paperboard carton from the outside surface. The energy ring substantially compresses the paperboard as part of the welding process and, in so doing, can create ply bond delamination of the paperboard fiber and cause surface tearing. This same tearing can occur on the inside of the paperboard, which is laminated or extruded with a barrier material such as foil or polyethylene. Any tearing or pinholing of the inside barrier material will compromise the barrier properties of the carton. Also, by positioning the energy ring on the ultrasonic horn and welding through the paperboard thickness, the energy ring is positioned at its farthest distance from the bonding surfaces.

What would therefore be desirable is an ultrasonic welding device in which the energy ring is located on the anvil in close proximity to the surfaces or components to be welded in order to minimize the deleterious side-effects of ultrasonic welding with the energy ring on the ultrasonic horn. What would also be desirable is an anvil and mandrel component that can be readily removed from an anvil housing in order to facilitate rapid change out of the anvil and mandrel without replacing the entire anvil housing when spout configuration changes or when the energy ring has excessive wear.

SUMMARY OF THE INVENTION

To overcome the drawbacks of the prior art, an apparatus and method is provided for attaching reclosable spouts to containers such as cartons. In the preferred embodiment, an anvil is provided with an energy ring disposed on its surface in order to provide improved mechanical and processing control over the ultrasonic welding of reclosable spouts to containers, thereby improving the quality and reliability of the welding process and of the welded container.

The containers may have a heat-sealable lamination, which can be melted to weld the spouts to the containers. Because the containers are only partially formed, they have open tops which include a die cut opening (referred to herein as a "preformed hole") for receiving a spout. When the containers are ultimately filled, the open tops can be sealed, leaving the spout accessible to the user for conveniently dispensing liquids, powders and the like from the container.

In operation, partially formed containers are conveyed to the anvil which is adapted for inserting spouts into the containers' preformed holes and attaching the inserted spouts to the containers. The anvil housing preferably has a center portion that is adapted for rotation along an axis transverse to the conveyance direction. Preferably, the anvil housing has two or more lobes which extend radially at regular angular intervals from the center portion. Each lobe includes an anvil which may be fixedly or removably attached to the lobe. Fixedly or removably attached to each anvil is a mandrel for engaging a spout. On the anvil surface adjacent the mandrel is an energy ring configured to abut the mounting flange of the spout when the spout is inserted into the preformed hole in the container for welding. A spout delivery system sequentially positions the spouts for serial engagement by the mandrels, for example, in between indexed movements of the conveyor. To engage a spout, the mandrel is inserted into the spout so that the spout fits over the mandrel with the spout's annular flange flush against or in close proximity to the energy ring of the anvil surface.

As the conveyor moves containers past the anvil housing, a drive mechanism or like device rotates the anvil housing to sequentially position a mandrel and an adjacent anvil and energy ring inside each of the passing containers. The rotational motion of the anvil housing is synchronized with the indexed operation of the conveyor. Thus, upon completion of each indexed conveyor movement, a mandrel is aligned with the container's hole for inserting a spout into the hole.

After the mandrel is aligned with a container's hole, a rotating and translating mechanism having, for example, a mechanical or pneumatic drive imparts a first translation motion to the anvil housing to cause the mandrel (and the spout thereon) to be inserted into the hole. As the first translational movement inserts the spout into the hole, the energy ring surface adjacent the mandrel presses the spout's annular flange against the inner container wall. An ultrasonic sealer then ultrasonically vibrates the container in the region of the hole. Due to the pressure exerted upon the spout flange by the anvil energy ring, the ultrasonic energy is generally focused by the ring onto the spout flange and adjacent laminate, causing the heat-sealable laminate to melt, thereby welding the spout's flange to the inner wall of the container.

The translational drive means also provides a second translation motion to withdraw the mandrel from the container hole after the ultrasonic sealer has welded the spout to the container. Because the spout is attached to the container, the withdrawal of the mandrel leaves the spout secured to the container, and leaves the mandrel available to accept another spout from the spout feed system.

Placing the energy ring onto the anvil instead of the ultrasonic horn facilitates bonding between the flange and carton surfaces. This enables a weld sequence to occur with less weld time and horn energy than when the energy ring is located on the ultrasonic horn. Since the energy ring is in contact with the plastic spout flange, and since the ultrasonic horn may now be machined with a flat surface (which contacts, for example, the outside surface of the paperboard container), ply bond delamination, tearing and pin-holing of the paperboard, inside and outside, are minimized. In the preferred embodiment, the spout mandrel and sealing anvil surface with the energy ring may be manufactured as a one-piece component. If the anvil surface or energy ring should wear from use, the part may be easily machined, or eventually replaced with minimal expense. Where the spout mandrel and sealing anvil surface are manufactured as a one-piece component, this part of the 'anvil housing' assembly, may be easily changed to accommodate another spout design, often without changing the ultrasonic horn. Alternatively, the anvil surface and the spout mandrel can be separately manufactured and subsequently assembled together.

DETAILED DESCRIPTION OF THE PREFERRED EMBODIMENTS

Figure 1:
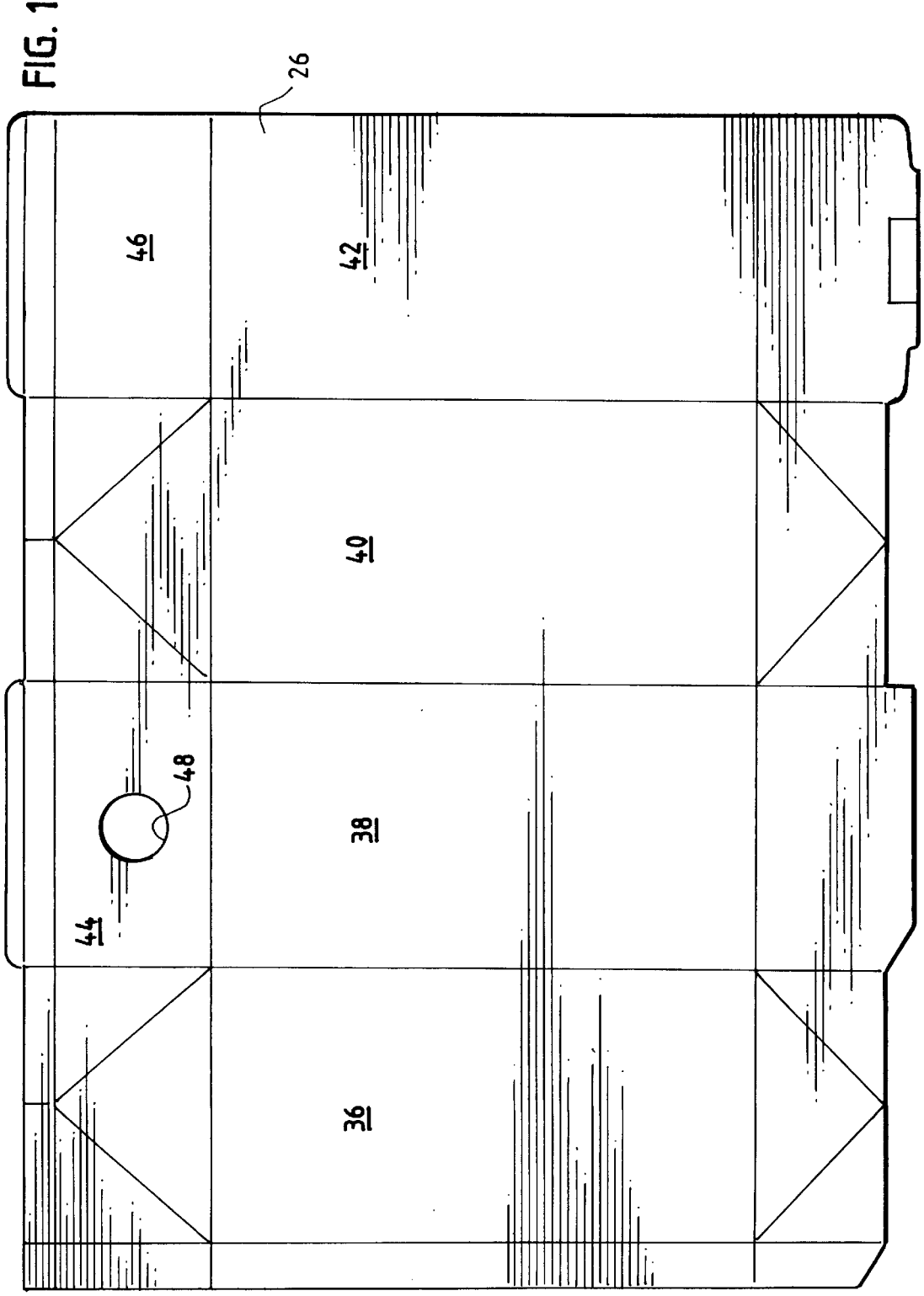
FIG. 1 is a top plan view of a paperboard blank.

The specific function of applicator 14 (FIG. 5) is to attach a spout 34 to each of partially formed cartons 30. FIG. 1 is a top plan view of one of the paperboard blanks 26. Blank 26 is conventional, and for clarity is shown completely unfolded.

Figure 2:
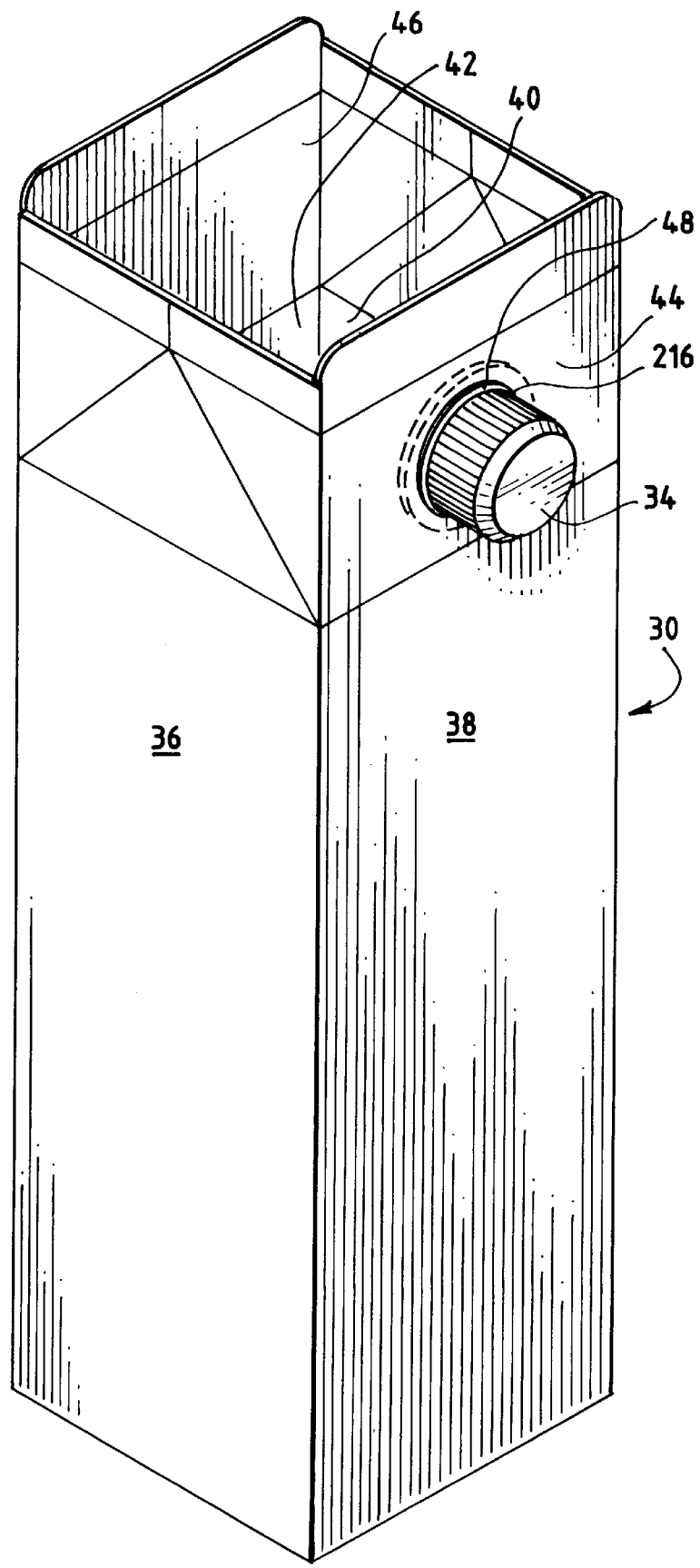
FIG. 2 is a perspective view of a partially formed carton.

As is well known, the paperboard of blank 26 is laminated with heat-sealing plastic. One side of the blank may also be laminated with barrier material such as metal or other material. When folded by a rotary carton forming station (not shown), panels 36, 38, 40 and 42 form sidewalls of partially formed carton 30, as illustrated in FIG. 2. When sealed by the sealing station (not shown), panels 44 and 46 form the angled sides of a gabled top, as illustrated in FIG. 3.

Figure 3:
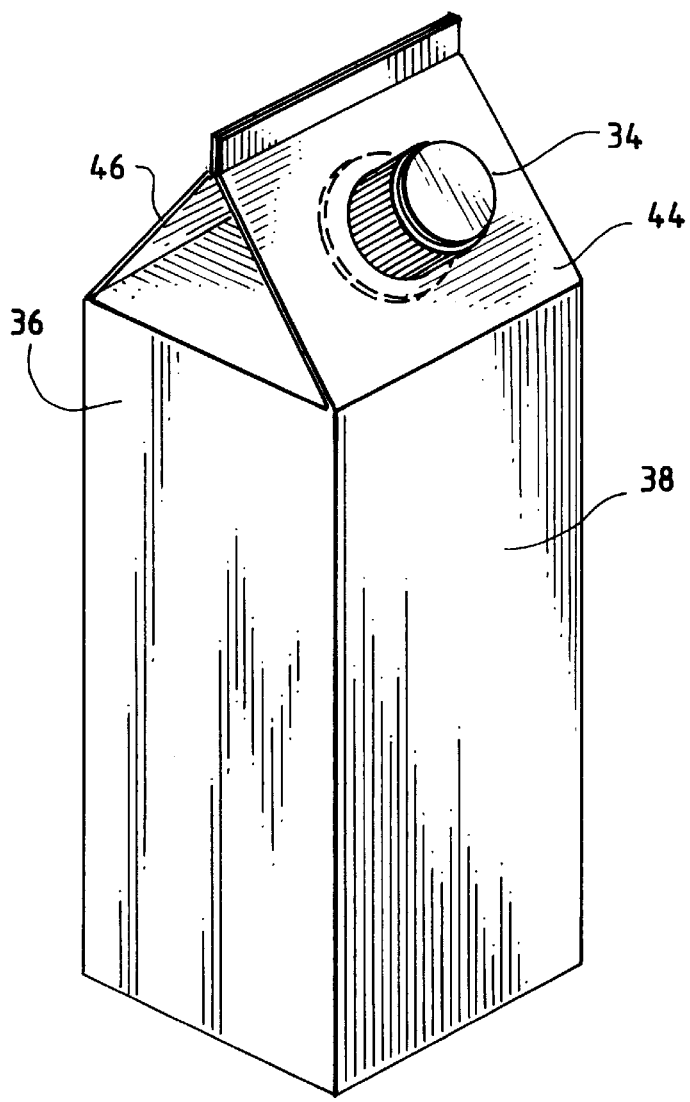
FIG. 3 is a perspective view of a completely formed carton.
Figure 4:
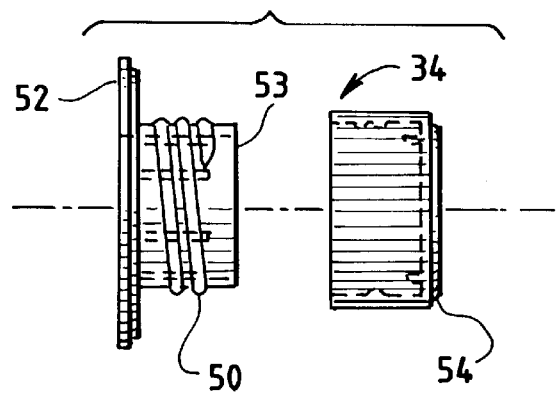
FIG. 4 is an exploded side view of a spout.

Referring to FIGS. 1, 2 and 3, a die cut hole 48 is formed completely through panel 44 for snugly receiving one of spouts 34. FIG. 4 is an exploded side view of one of spouts 34. Each of conventional spouts 34 is a plastic cylinder 50 having a flanged end 52 for mounting to partially formed carton 30. The end 53 of cylinder 50 is threaded for receiving a removable cap 54. As discussed below in greater detail, spout 34 is inserted from the interior of partially formed carton 30 so that threaded end 53 of spout 34 extends outwardly from panel 44, and mounting flange 52 is flush against the interior side of panel 44. It is understood that spout 34 is described by way of example and that the invention also contemplates the use of other types of fitments including hatches and the like.

Figure 5:
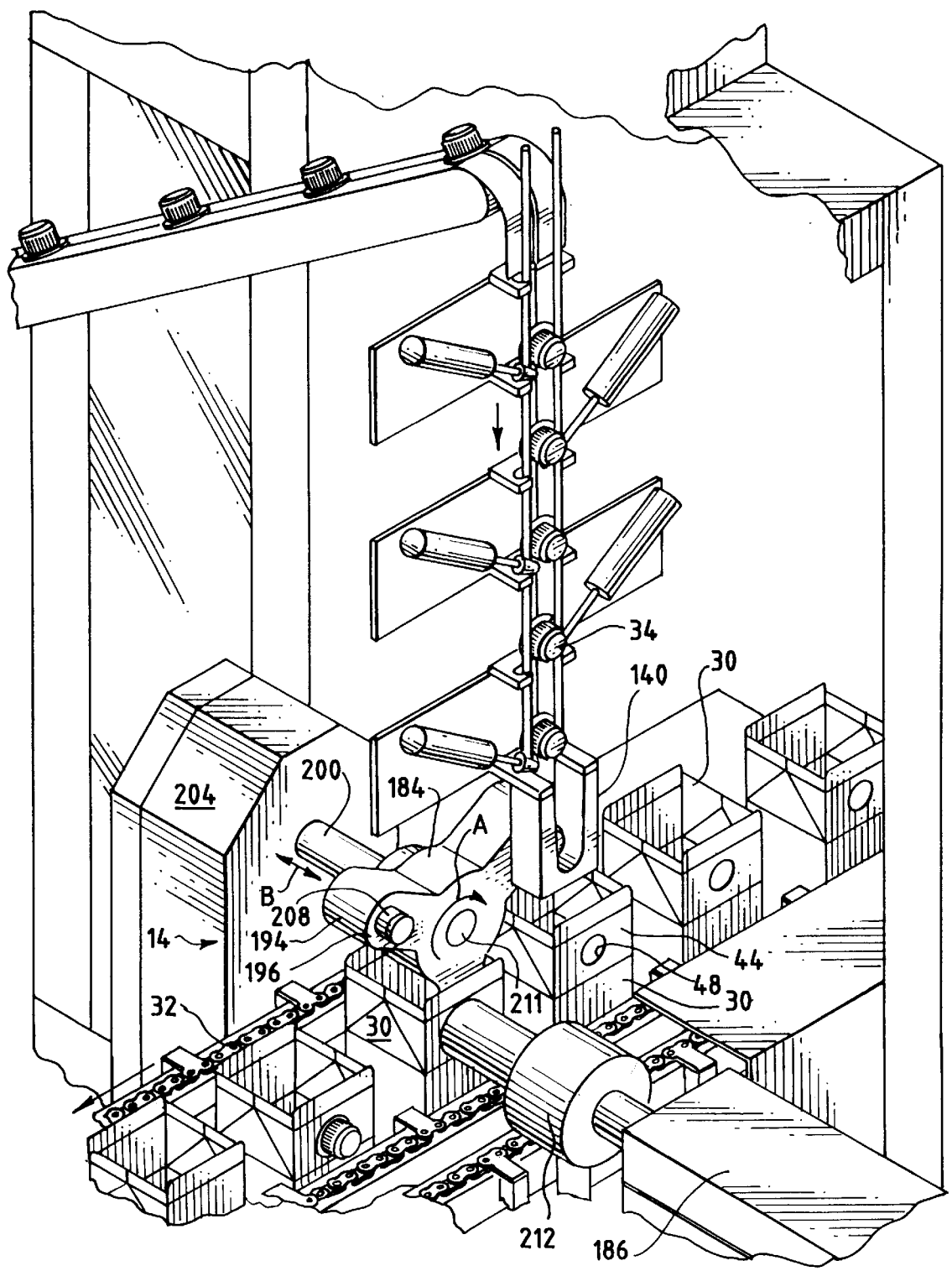
FIG. 5 is a perspective view of an applicator system.
Figure 6:
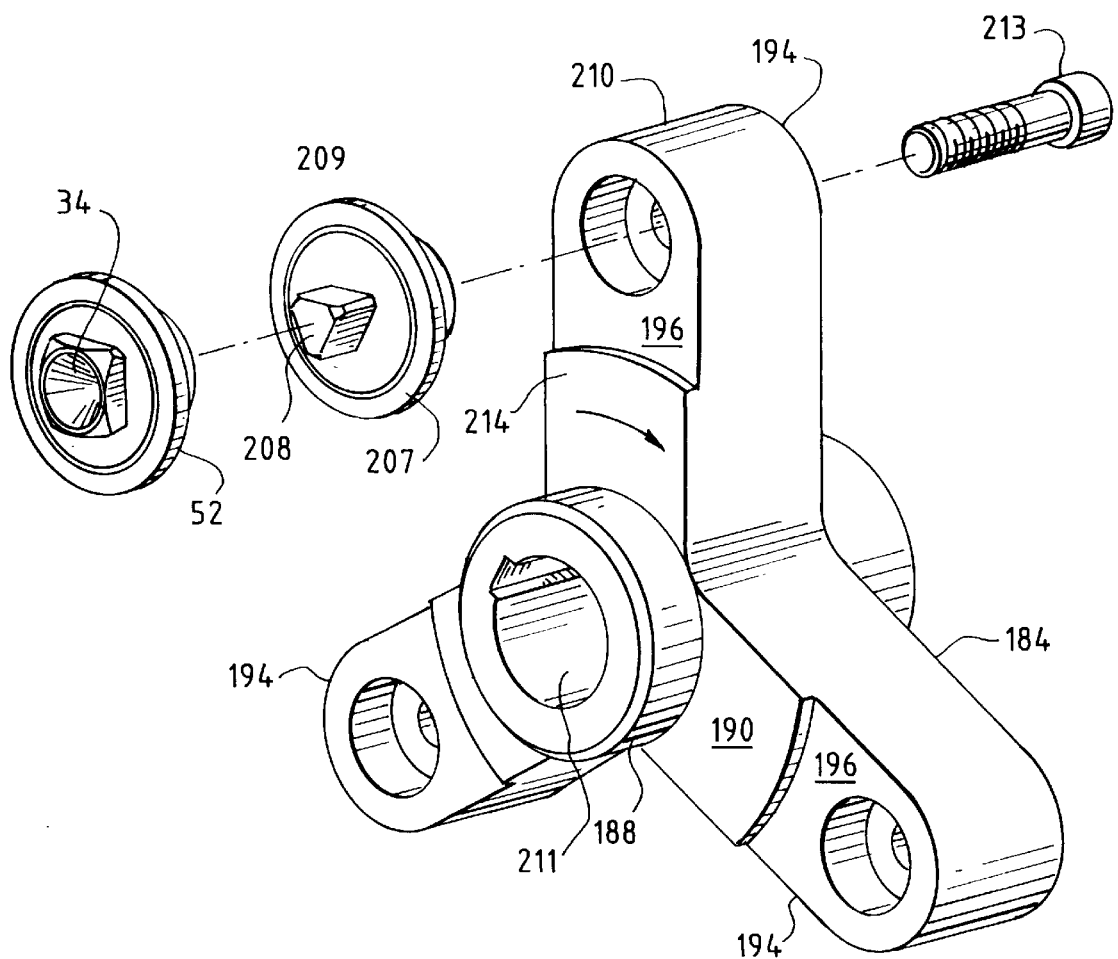
FIG. 6 is a front view of the rotary anvil of FIG. 5.

As shown in FIG. 5, the applicator system comprises a rotary anvil housing 184 and an ultrasonic sealer 186. As explained below in detail, the rotating anvil housing 184 picks up one of spouts 34 from escapement 140 and transfers it in a rotary motion indicated by the arrow A to the inside of one of partially formed cartons 30. Once inside the carton 30, the anvil housing 184 moves in a translational motion indicated by the arrow B to insert the spout 34, capped-end first, through the die cut hole 48 and to press mounting flange 52 flush against the interior side of panel 44 of the partially formed carton and also against energy ring 209 (FIG. 6). Concurrently, the ultrasonic sealer 186 ultrasonically vibrates the periphery of the hole 48, thus heating the heat-sealable plastic laminate adjacent to mounting flange 52, thereby welding the mounting flange to the interior wall of the carton. Rotary anvil housing 184 and its associated anvil 207 and energy ring 209 must be of sufficient strength to withstand this welding process. To better understand the operation of applicator system 14, the structure and function of its components are discussed below in detail.

Figure 7:
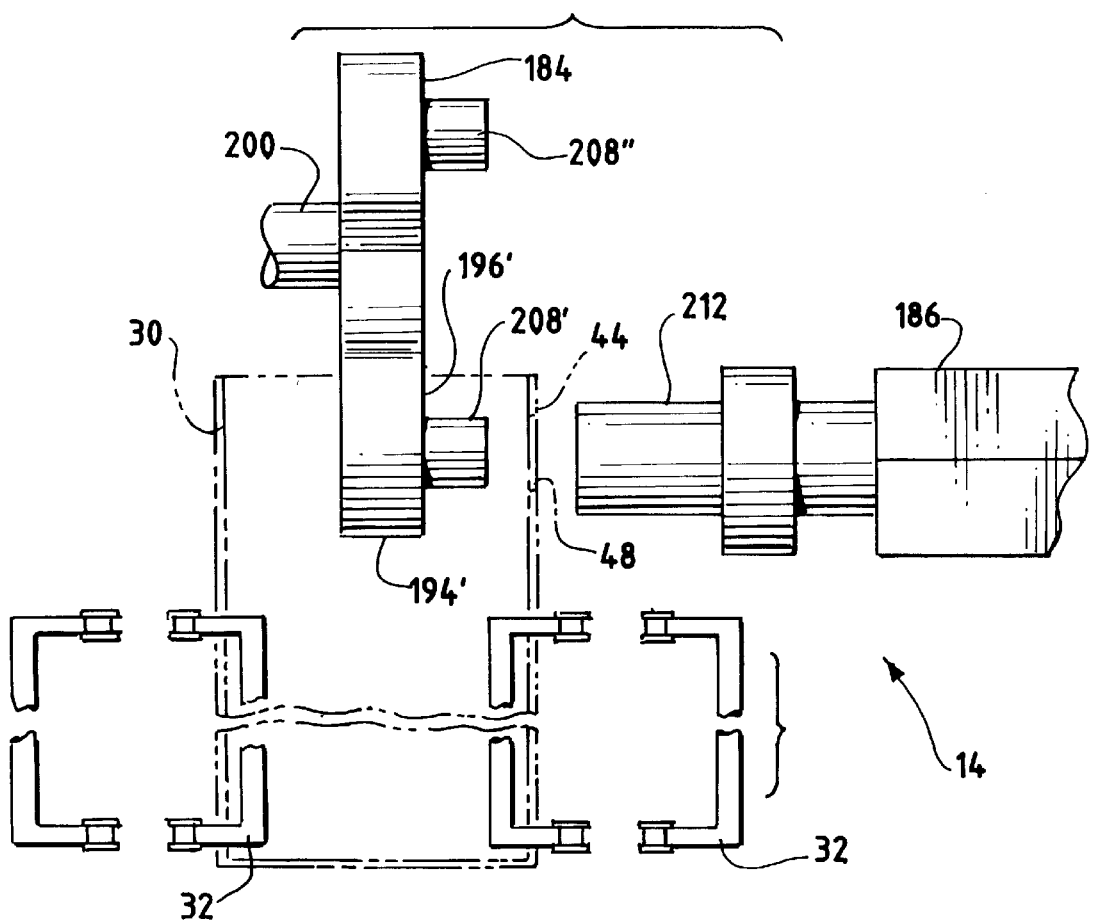
FIG. 7 is a side view of the applicator system of FIG. 5.

Referring to FIGS. 6 and 7, rotary anvil housing 184 is of metal and consists of a central disk portion 188 having front and rear parallel planar faces 190 and 192 (not shown), respectively. Preferably, three lobes 194 extend radially at 120 degree increments from disk 188. As will be explained, more or fewer lobes 194 may be used. Each lobe is of a width somewhat larger than the diameter of mounting flange 52 of spout 34. Each lobe has a front face 196 which may, but need not be, coplanar with the front face 190 of central disk portion 188.

Figure 8:
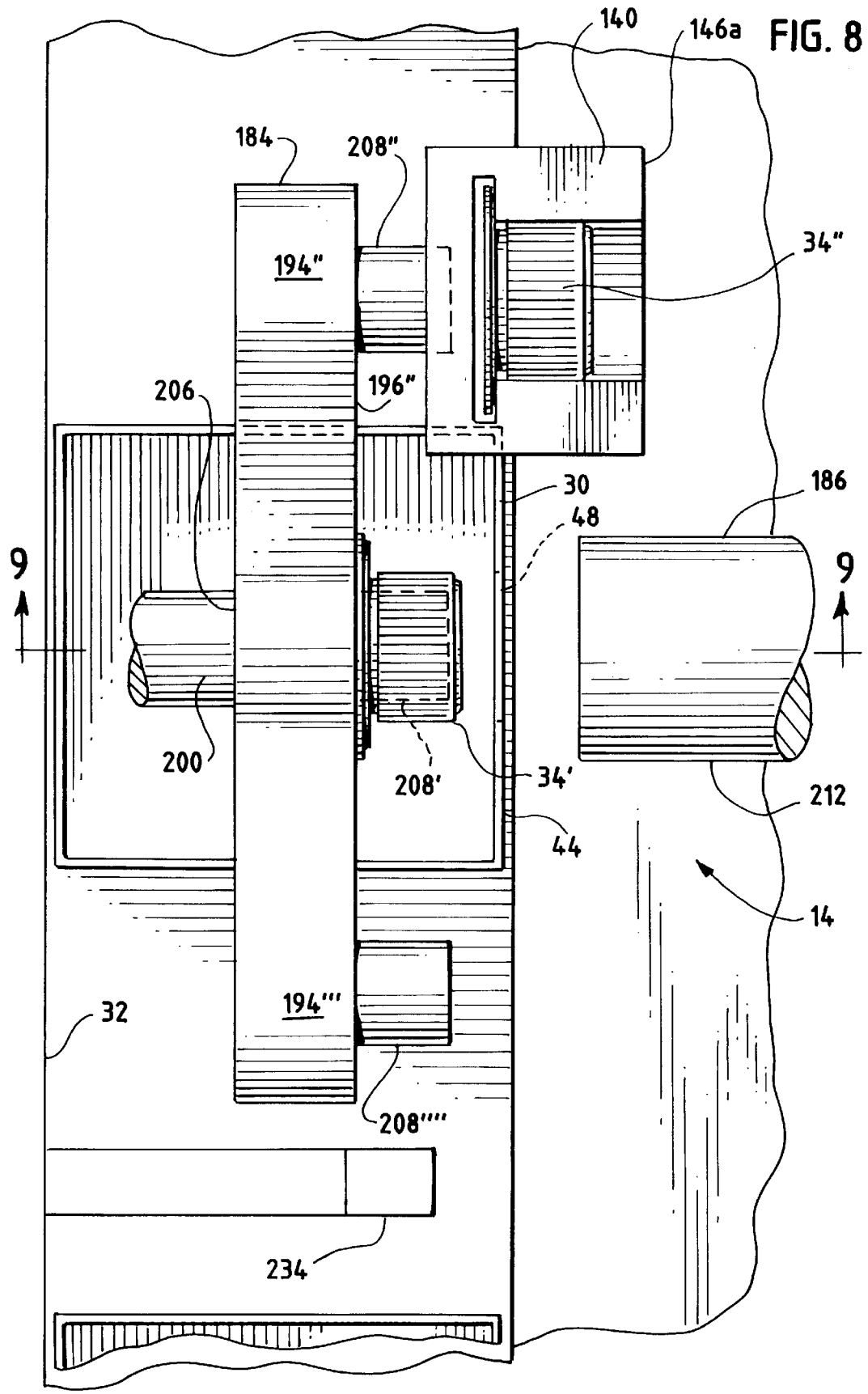
FIG. 8 is a partial top view of the applicator system of FIG. 5.

Rotary anvil housing 184 is mounted for rotational and axial translational motion on a shaft 200, which is centrally mounted on the rear side of central disk portion 188 as best seen in FIGS. 7 and 8. Shaft 200 is mounted in a conventional drive source 204 suitable for imparting periodic rotational and translational motion to the anvil housing 184. For example, the drive source may be mechanical, pneumatic or hydraulic. Preferably, drive source 204 is mounted to housing 18 on one side of carton conveyor 32 so that the end 206 of shaft 200 remote from the drive source 204 extends transversely over carton conveyor 32, and at a height above conveyor 32 so as not to interfere with the passing of partially formed cartons 30. Because end 206 of shaft 200 extends only about half way across carton conveyor 32, the anvil housing 184 (which is mounted on end 206) is suspended above the partially formed cartons 30 passing past shaft 200 on conveyor 32. Shaft 200 imparts axial translational motion to anvil housing 184 by moving toward and away from conveyor 32 to insertion and retraction positions respectively. Normally, shaft 200 remains in the retraction position.

Referring to FIGS. 5–7, disposed on the front face 196 of each lobe 194 is an anvil 207 and a mandrel 208. The mandrel 208 can either be machined on the anvil 207 surface or secured to the anvil surface by means of a machine bolt (not shown). Likewise, each anvil or anvil/mandrel combination can either be machined as an integral part of the anvil housing 184 or, preferably, can be secured to the anvil housing by means of a machine bolt 213, threaded assembly or press fit to facilitate removal from the anvil housing. Although the present invention is not so limited, the anvil may be manufactured from a hard metal, such as stainless steel, and the spout mandrel manufactured from an energy absorbing material such as a urethane or rubber. By so doing, one may selectively prevent the transfer of energy to specific areas or physically contact the area or part that needs to be dampened from vibrations.

Each anvil 207 has configured thereon, and extending a predetermined perpendicular distance from the front face of the anvil, an energy ring 209. The mandrel 208 also extends perpendicularly from the front face of the anvil. Preferably, each anvil 207, as well as its associated mandrel 208 and energy ring 209, is located near the tip 210 of its respective lobe 194, at exactly the same distance from the center point 211 of central disk portion 188. Preferably each mandrel 208 is cylindrical in shape, and is of a length and diameter so as to snugly fit inside the cylindrical portion 50 of each spout 34 and, thereby, maintain the relative positions of the spout and mandrel when the mandrel is inserted into the spout. Likewise, energy ring 209 is preferably shaped to conform to the shape of mounting flange 52 of spout 34.

Ultrasonic sealer 186 is a known, commercially available device. It is mounted to housing 18 in any suitable manner so that it is positioned on the side of conveyor 32 opposite drive source 204. Ultrasonic sealer 186 includes a hollow cylindrical horn 212 in a horizontal orientation. The longitudinal axis of horn 212 is perpendicular to the plane of anvil housing front face. Horn 212 is capable of translational motion toward and away from anvil housing 184 by means of a conventional drive source (not shown).

Of importance is the timing and positioning of the rotary anvil housing 184, the ultrasonic sealer 186, the partially formed cartons 30, and the escapement 140. Reference is made to FIG. 8, which is a top view of the applicator 14 showing partially formed carton 30 directly under anvil housing 184. It will be appreciated from the foregoing description that the rotary anvil housing 184 is suspended above conveyor 32 with the front face 196 of each lobe 194 parallel to the direction of carton conveyor 32 and facing toward the ultrasonic horn 212. In the illustrated embodiment, carton conveyor 32 is moving partially formed cartons 30 toward the filling station 22 so that the panel 44 containing hole 48 is also parallel to the front face 196 of each lobe 194.

As mentioned, conveyor 32 is conventionally indexed to periodically move cartons 30 a predetermined distance. With each index of the conveyor 32, the partially formed cartons 30 are sequentially moved into a position centered directly under anvil housing 184 as shown in FIG. 5. Concurrently with the indexed movement of the conveyor 32, the shaft 200 imparts 120 degrees of rotational motion (indicated by the arrow 214 in FIG. 6) to the anvil housing 184. The anvil housing 184 is mounted on shaft 200 so that this rotational motion leaves the anvil housing 184 in a position (the "anvil housing operating position") with one lobe 194, and its respective anvil, mandrel and energy ring, extending directly vertically downward, and the other two lobes 194, and their respective anvils, mandrels and energy rings, extending outward.

After the conveyor 32 has been indexed and anvil housing 184 has been rotated 120 degrees to the next anvil housing operating position, the downwardly extending one of lobes 194 will be positioned in the interior of a partially formed carton 30, as best seen in FIG. 7. At this point in time, shaft 200 remains in its retracted position. The length of shaft 200 is selected so that the front face 196 of downwardly extending lobe 194 is suspended in parallel spaced relation to panel 44, as best seen in FIG. 7. Preferably, mandrel 208 is spaced from the center point 211 so that it is exactly aligned for insertion into hole 48 when its respective lobe 194 is inside the cartons 30, as indicated by FIGS. 7 and 8.

Referring to FIGS. 5 and 8, it will be observed that escapement 140 is positioned so that when anvil housing 184 is in the anvil housing operating position, one of the lobes 194 extends behind the escapement 140 so that its mandrel 208 is vertically and horizontally aligned for insertion into the cylinder 50 of one of spouts 34 which has been dropped into escapement 140. Likewise, anvil 207 and energy ring 209 are vertically and horizontally aligned such that when the mandrel 208 is aligned for insertion into cylinder 50, energy ring 209 is aligned to abut mounting flange 52.

Thus, the rotary anvil housing 184 initially has one mandrel 208 and energy ring 209 aligned with one of the unattached spouts 34 in escapement 140, and another mandrel 208 aligned with the hole 48 in panel 44 of the partially formed carton 30 which the carton conveyor 32 has moved underneath the anvil housing 184. In a manner described below, one of unattached spouts 34 has already been placed on mandrel 208.

Next, shaft 200 moves into its insertion position, imparting an axial translational movement to anvil housing 184. This translational motion causes mandrel 208 to be inserted into spout 34 resting in escapement 140. Mandrels 208 are sized to fit snugly inside the cylinders 50 of spouts 34 such that when insertion is completed, energy ring 209 abuts mounting flange 52. Thus, when mandrel 208 is inserted into spout 34, mandrel 208 engages the interior walls of the spout 34 with a friction of force fit and energy ring 209 presses flush against mounting flange 52. Because mounting flange 52 is flush against the rearward walls (shown) of escapement 140, spout 34 remains stationery against this force, and mandrel 208 is inserted therein by the aforementioned translational movement.

Figure 10:
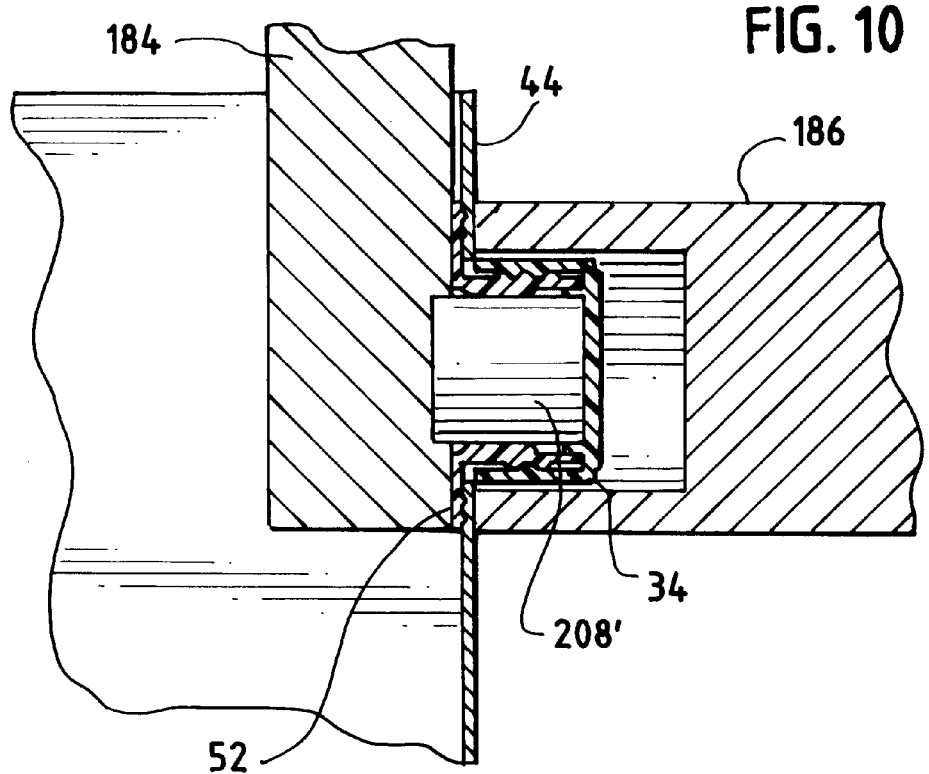
FIG. 10 is the partial sectional view of FIG. 9 at a second point in time.
Figure 6:
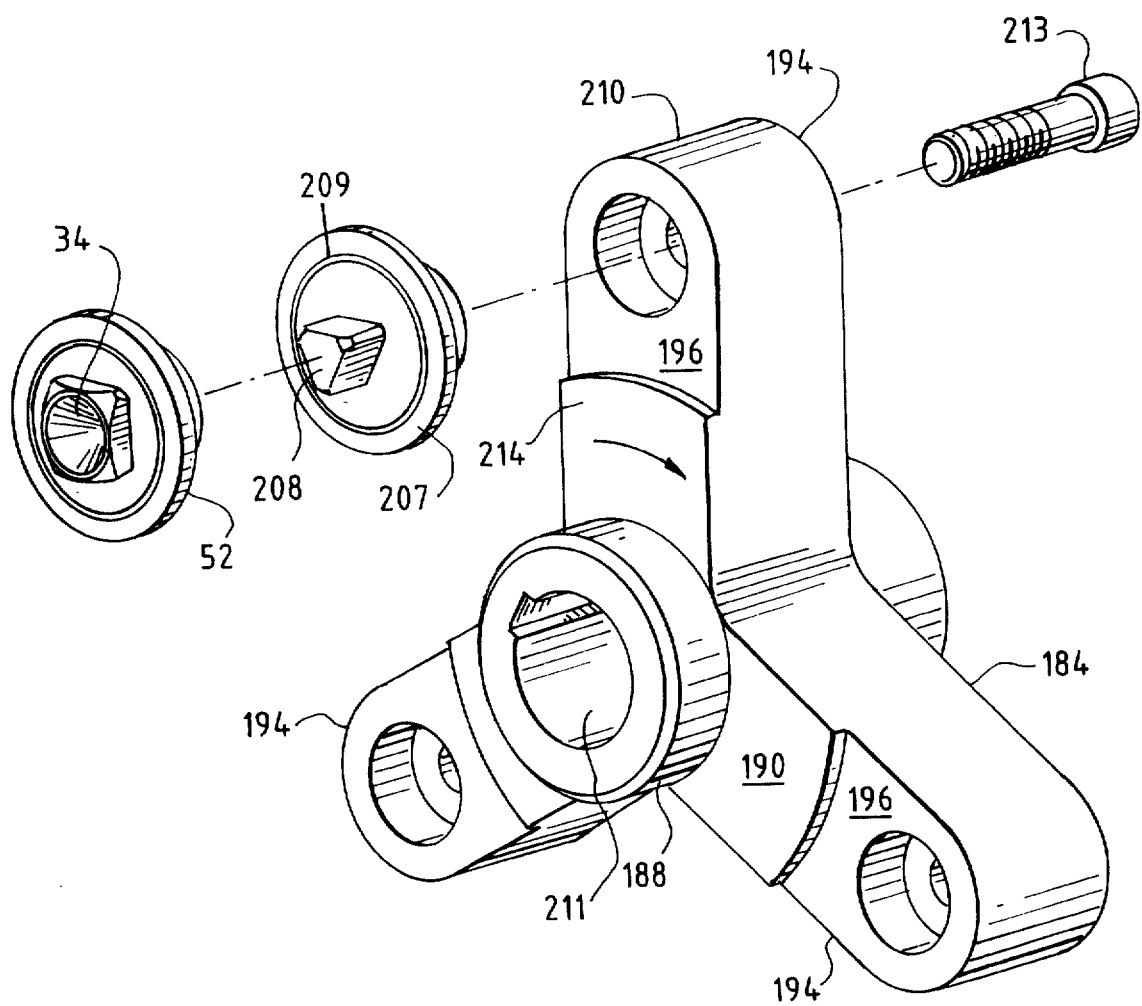

Subsequently, mandrel 208 (and the spout 34 into which mandrel 208 has been inserted) is inserted into hole 48, as best seen in FIG. 10. Thus, the capped end 54 of spout 34 is inserted through the hole 48 and extends outwardly from panel 44. The aforementioned translational motion moves lobe 194 forward so that its front surface 196 pushes mounting flange 52 flush against the interior side of carton panel 44.

While shaft 200 remains in this insertion position, ultrasonic sealer 186 moves an ultrasonic welding horn 212 toward carton 30 to engage a doughnut-shaped region 216 of panel 44 (See FIG. 2) which surrounds hole 48 and superimposes mounting flange 52 which is frictionally disposed between energy ring 209 and the heat-sealable plastic laminate adjacent to the mounting flange 52. Welding horn 212 then ultrasonically vibrates region 216, the ultrasonic energy being focused on mounting flange and adjacent laminate by energy ring 209. As a result, the heat-sealable plastic laminate adjacent to the mounting flange 52 is heated and melted, thereby welding the mounting flange to the interior side of panel 44. By focusing the ultrasonic energy on the mounting flange and adjacent laminate, weld time and horn energy are minimized, thus eliminating the delamination, tearing and pin-holing of the container that would otherwise occur.

Figure 9:
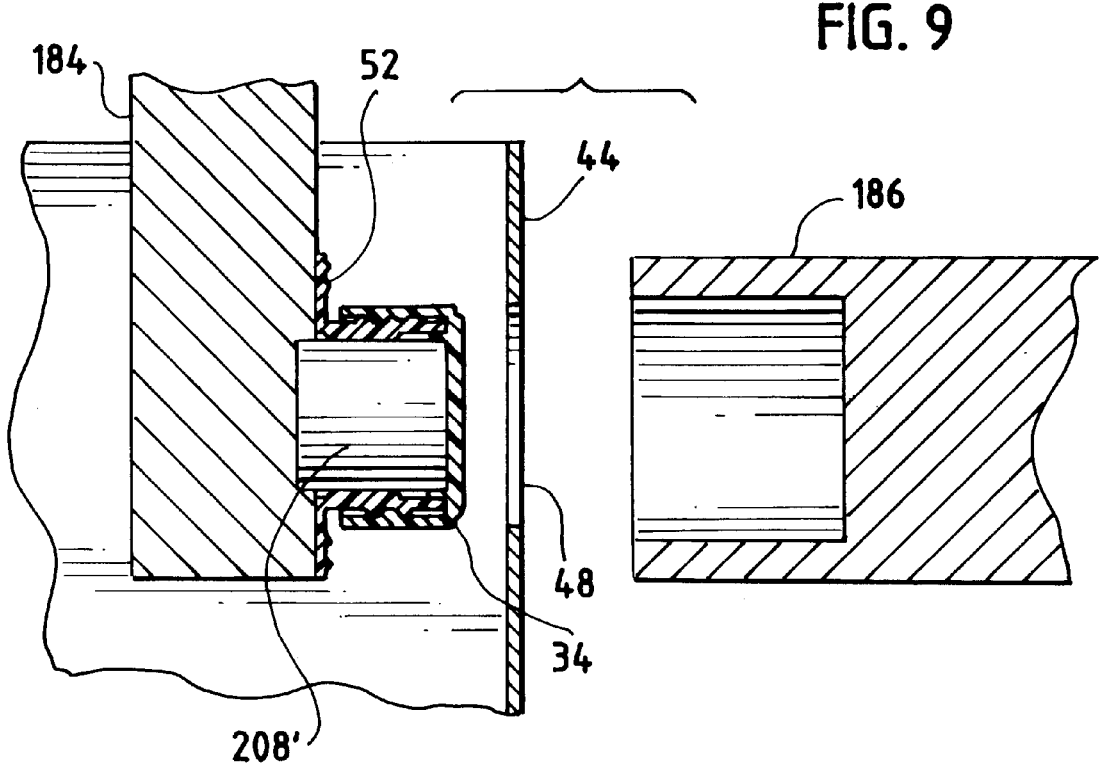
FIG. 9 is a partial sectional view of the applicator system of FIG. 8 taken along the lines 26—26 at a first point in time.

Upon completion of the welding process, the ultrasonic sealer 186 retracts to its original position, as show in FIG. 9. At the same time, mandrel 208 is retracted from spout 34 and hole 48. Notwithstanding the presence of friction forces acting on spout 34, spout 34 remains in hole 48, permanently attached by virtue of the spout's welded mounting flange 52. In this manner, the spout 34 has been effectively attached to panel 44 of carton 30.

In operation, it is important to position the energy ring in close proximity to the surfaces which are to be sealed together. If the energy ring is not in close proximity to the seal points, random energy (sometimes referred to as sympathetic energy) is transmitted to other portions of the materials which are touched, directly or indirectly, by the ultrasonic horn. This random energy may be transmitted in harmonic cycles to the immediate materials, such as the paperboard and plastic cap, and also the machine parts, such as the anvil, anvil housing, the anvil housing shaft (which rotates the anvil housing), and even into portions of the machine. Placing the energy ring in close proximity to the weld surfaces maintains or concentrates the ultrasonic energy onto the seal area and, thereby, minimizes the amount of time and pressure required to effect the seal. Such energy ring placement also minimizes the transfer and impact of this random energy.

In operation, placement of the energy ring in close proximity to the surfaces to be sealed together is especially important where, for example, a plastic wall section is intentionally thin, to provide a line-of-weakness for facilitating the removal of an inner membrane part. If the energy ring is not placed in close proximity to the surfaces to be sealed, the ultrasonic energy will not be effectively focused on that part. Instead, the ultrasonic energy will travel along the surface of the plastic part and concentrate at the thin wall section, thereby causing that section to heat and separate from, for example, an adjacent thick wall section. This phenomena, known as "de-gating," can cause the inner membrane to prematurely separate and cause container spouts to leak undesirably. Unlike conventional ultrasonic systems having an energy ring on the horn, the present invention, having an energy ring on the anvil and, thus, in close proximity to the part to be sealed, now permits sensitive spout constructions, such as those incorporating thin wall sections, to be sealed.

While the invention has been described with respect to the preferred embodiments, variations modifications, substitutions and alternatives will be apparent to those skilled in the art and accordingly, the scope of the invention should be defined by the appended claims and equivalents thereof.

What is claimed is:

1. An apparatus for attaching to the interior surface of a container wall a spout having a flange on one end thereof, the container having a preformed hole adapted for receiving the end of the spout opposite the flange, said apparatus comprising:

(a) an anvil housing having an anvil and a mandrel projecting from said anvil, said mandrel being adapted to receive a spout for attachment to a container, said anvil having a raised annular surface substantially surrounding said mandrel for contacting a first surface of the flange of a spout positioned on said mandrel;

(b) drive means for engaging the flanged end of the spout on said mandrel and positioning said anvil housing such that said mandrel and the end of the spout opposite the flange project through the preformed hole of the container with the surface of the flange opposite the first surface positioned adjacent to the interior surface of the container; and (c) sealing means for securing the flange of the spout to the interior surface of the wall of the container, said sealing means having a surface for contacting the exterior surface of the wall of the container in proximity to said at least one anvil such that the wall of the container and the flange of the spout are sandwiched between said raised annular surface on said anvil and said surface of said sealing means, wherein said sealing means causes the flange to be fused to the interior surface of the wall of the container.

2. The apparatus of claim 1 wherein said sealing means further comprises an ultrasonic sealer whereby ultrasonic vibration causes heating of the wall of the container and fusing of the flange of the spout to the wall of the container.

3. The apparatus of claim 1 wherein said anvil housing further comprises a plurality of anvils, each said anvil having a mandrel projecting therefrom for receiving a spout for attachment to a container, each said anvil having a raised annular surface substantially surrounding one of said mandrels, and wherein said drive means further comprises means for positioning sequentially each of said plurality of anvils in successive containers, whereby a spout is positioned for attachment to each container.

4. The apparatus of claim 1 wherein said anvil is removably attached to said anvil housing.

5. The apparatus of claim 4 wherein said mandrel is fixedly attached to said anvil.

6. The apparatus of claim 1 wherein said mandrel is removably attached to said anvil.

7. The apparatus of claim 1 wherein the raised annular surface of said anvil has a cross-section that is narrower than the width of the flange.

8. An apparatus for attaching a spout having a flange to a preformed hole in a container wall, said apparatus comprising:

an anvil having a raised annular surface disposed thereon for contacting the flange;

a mandrel disposed on said anvil for positioning the spout in the preformed hole with the spout flange between said raised annular surface and the interior surface of the container wall; and an ultrasonic sealer having a horn engagable with the exterior surface of the container wall such that, when so engaged, vibration of said horn vibrates the interior surface of the wall of the container against the flange and the flange against said raised annular surface, whereby the interior surface of the wall of the container is heated so as to fuse the flange to the wall of the container.

9. An apparatus for attaching a spout having a flange to the interior surface of a container wall having a preformed opening adapted to receive the spout, said apparatus comprising:

a housing;

an anvil movably mounted on said housing and having a mandrel adapted to hold a spout for attachment to the container wall, said anvil having a raised annular surface for contacting a first surface of the flange of a spout held by said mandril, said anvil and mandrel being movable between an unengaged position and an engaged position, wherein in the engaged position said anvil is positioned such that a second surface of the flange opposite the first surface is adjacent the interior surface of the container wall;

a horn movable between an engaged position and an unengaged position, wherein in the engaged position said horn is positioned adjacent the exterior surface of the container wall; and an ultrasonic sealer having a vibrating horn, wherein when said horn and said anvil are in the engaged position said horn is pressed against the exterior surface of the container wall and the interior surface of the container wall in turn is pressed against the second surface of the flange, and the first surface of the flange is pressed against the raised annular surface on said anvil, whereby the vibration of said horn causes the second surface of the flange to become fused to the interior surface of the container.

10. A method for attaching a spout having a flange to the interior surface of a container wall having a preformed opening adapted to receive the spout, said method comprising:

engaging a spout onto a member adapted to receive a spout and having a raised annular surface, the flange of the spout being positioned over said raised annular surface;

aligning the preformed hole and the spout engaged on said member, with the spout facing the interior surface of the container wall;

changing the position of said member with respect to the preformed opening so as to cause the spout to protrude through the preformed opening with the flange abutting against the interior surface of the container;

pressing the wall of the container against the flange and the flange against said raised annular surface so as to attach the flange to the wall of the container;

causing said member to be withdrawn from the spout; and causing said member to be withdrawn from the interior of the container.

11. The method of claim 10 wherein said step of pressing the wall of the container against the flange further comprises heating the wall of the container in the vicinity of the flange while the wall and flange are pressed against said raised annular surface to cause the flange to become fused to the interior surface of the wall of the container.

12. The method of claim 10 wherein said member is an anvil.

13. The method of claim 10 wherein said member is a horn on an ultrasonic sealer.

14. An anvil for supporting at least two layers of material against an ultrasonic sealing horn wherein said anvil has a raised annular surface for contacting a surface of one of said layers, whereby energy imparted to said layers is concentrated in the vicinity of said raised annular surface.

15. An apparatus for attaching a spout having a flange to a preformed hole in a container wall, said apparatus comprising:

an anvil having a raised annular surface disposed thereon for contacting the flange;

a mandrel disposed on said anvil for position the spout in the preformed hole with the spout flange between said raised annular surface and the interior surface of the container wall; and a member having a surface engageable with the exterior surface of the container wall such that, when so engaged, the interior surface of the container wall is pressed against the flange and the flange against said raised annular surface, whereby the flange becomes fastened to the interior surface of the container wall in the vicinity of said raised annular surface.

* * * * *

UNITED STATES PATENT AND TRADEMARK OFFICE
CERTIFICATE OF CORRECTION

PATENT NO. : 6,085,489  
DATED : July 11, 2000  
INVENTOR(S) : Jerry G. Bachner and Michael A. Kipp It is certified that error appears in the above-indentified patent and that said Letters Patent is hereby corrected as shown below:

Column 2, line 27, delete "device in" and insert -- device is --  
(Patent Application page 3, line 12);

Column 7, line 3, delete "(shown)" and insert -- (not shown) --  
(Amendment dated December 15, 1999, page 2, line 2);

Please add a lead line to numeral 209 in FIG. 6 as shown in red in the accompanying drawing.

Column 7, line 4, delete "stationery" and insert -- stationary --  
(Patent Application page 12, line 6).

Signed and Sealed this

First Day of May, 2001

Attest:

NICHOLAS P. GODICI

*Attesting Officer*  *Acting Director of the United States Patent and Trademark Office*